United States Patent [19]

Pfanstiehl

[11] Patent Number: 5,006,799
[45] Date of Patent: Apr. 9, 1991

[54] LOW COST MAGNETIC COATING THICKNESS GAUGE WITH HOLDING MAGNET, BIAS SPRING AND HOLDING FORCE INDICATOR

[76] Inventor: John G. Pfanstiehl, 880 Mandalay S-407, Clearwater Beach, Fla. 34630

[21] Appl. No.: 278,348

[22] Filed: Dec. 1, 1988

[51] Int. Cl.[5] .......................... G01B 7/10; G01B 5/06
[52] U.S. Cl. ...................................... 324/230; 33/834
[58] Field of Search .............................. 324/229–231; 33/834

[56] References Cited

U.S. PATENT DOCUMENTS

| 2,625,585 | 1/1953 | Krouse | 324/230 X |
| 2,749,505 | 6/1956 | McNary | 324/230 |
| 3,761,804 | 9/1973 | Steingroever | 324/230 |
| 4,160,208 | 7/1979 | Steingroever et al. | 324/230 X |
| 4,392,305 | 7/1983 | Nix et al. | 324/230 X |
| 4,433,290 | 2/1984 | Koch | 324/230 |
| 4,634,974 | 1/1987 | Hunter | 324/228 |

FOREIGN PATENT DOCUMENTS

| 215169 | 5/1960 | Austria | 33/169 F |
| 3611798 | 6/1987 | Fed. Rep. of Germany | 324/230 |
| 590591 | 2/1978 | U.S.S.R. | 33/169 F |
| 799768 | 8/1958 | United Kingdom | 324/230 |
| 907721 | 10/1962 | United Kingdom . | |

OTHER PUBLICATIONS

Biddle Instruments, "Thickness Gauges", Bulletin 28, Nov. 1987.

Primary Examiner—Gerard R. Strecker

[57] ABSTRACT

A low cost magnetic gauge that measures the thickness of non-ferrous coatings such as paint on ferrous materials such as auto bodies. Construction consists principally of two telescoping tubes, connected by a spring, with a permanent magnet at the end of one tube. In operation, the magnet tube is placed against the surface being tested, and the other tube is pulled away from the surface. In a first embodiment, indicia are exposed as the non-magnet tube is pulled away, the reading being the last number exposed before the magnet tube pulls off the surface. A second embodiment employs a ratchet to hold the tubes apart at their maximum extension to facilitate reading. A third embodiment uses a wedge for the same purpose. A fourth embodiment adds a member which is drawn along the non-magnet tube by the magnet tube, and stays at its furthest extension on the non-magnet tube, due to a slight frictional load, when the magnet tube pulls off the material being tested. This embodiment permits recording of the reading, and fast one-hand operation of the gauge. The structure of this invention permits manufacturing costs far below any current coating thickness gauges.

38 Claims, 6 Drawing Sheets

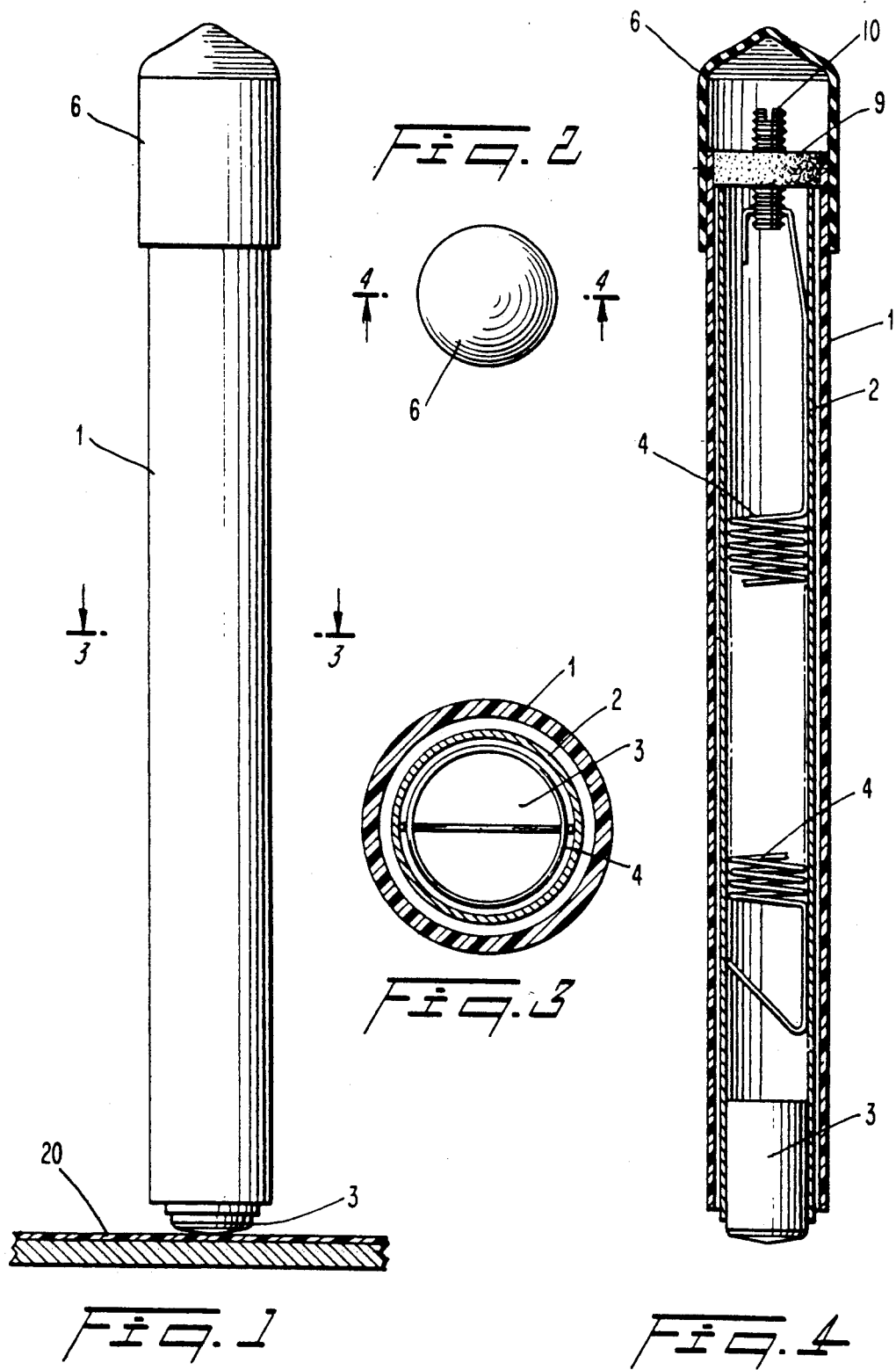

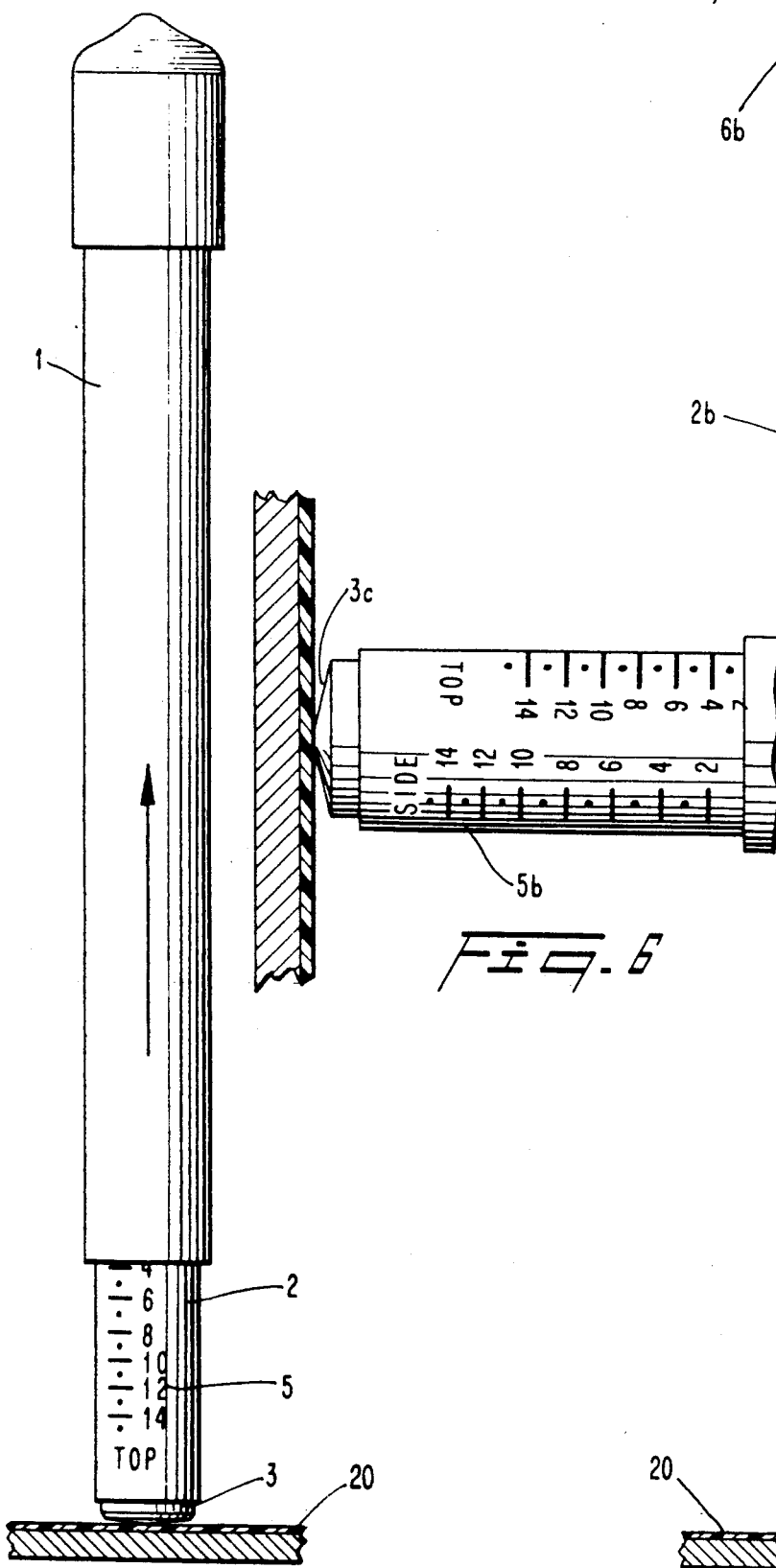
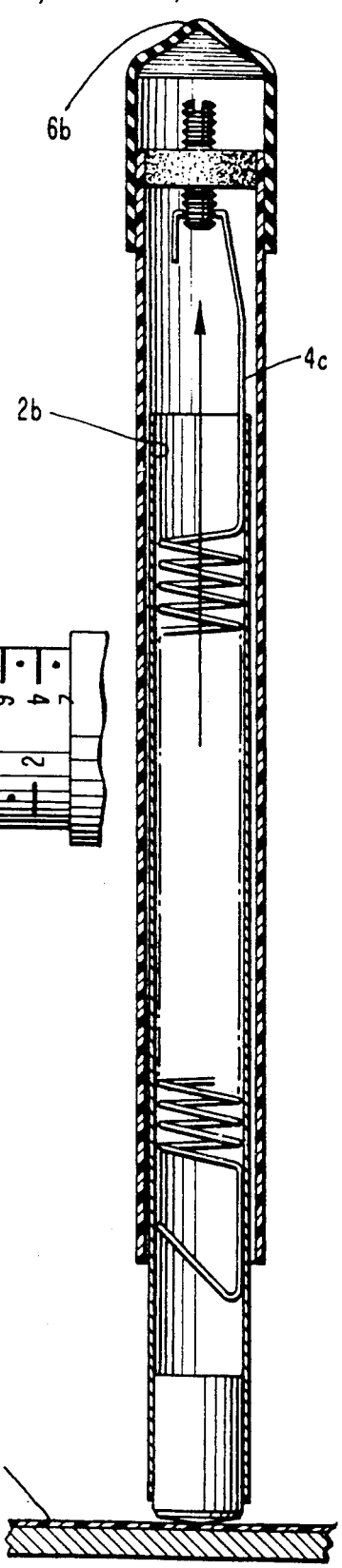

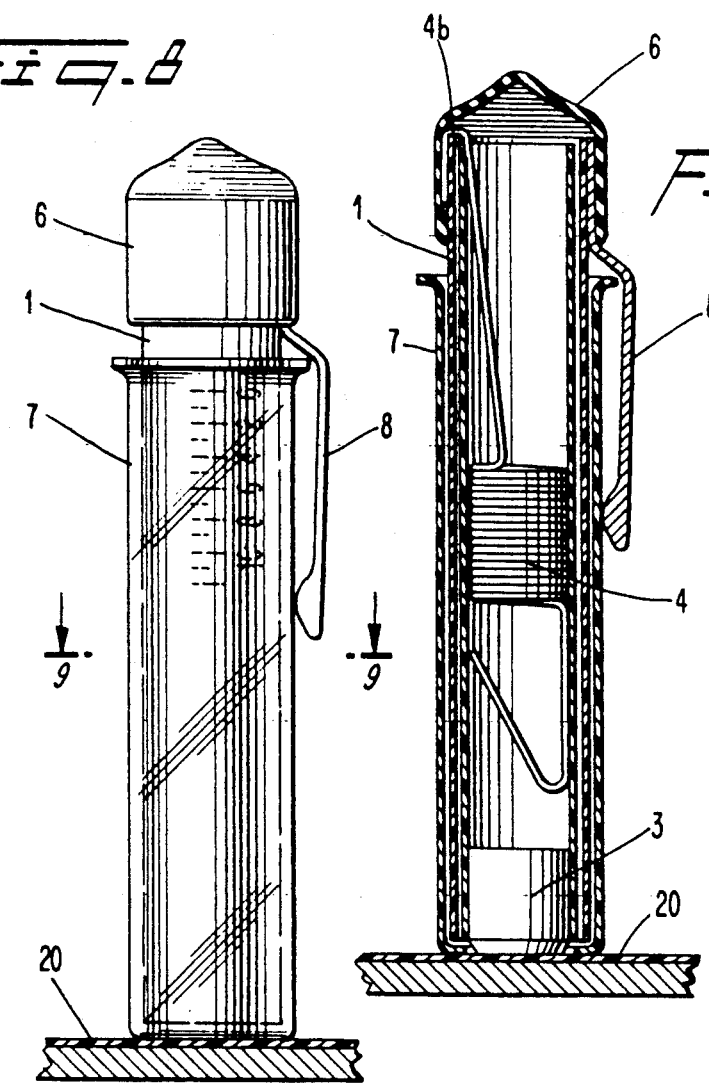
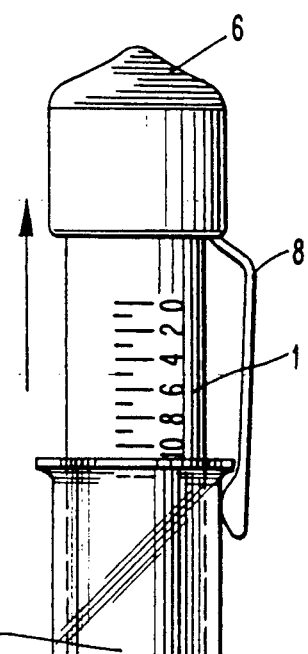
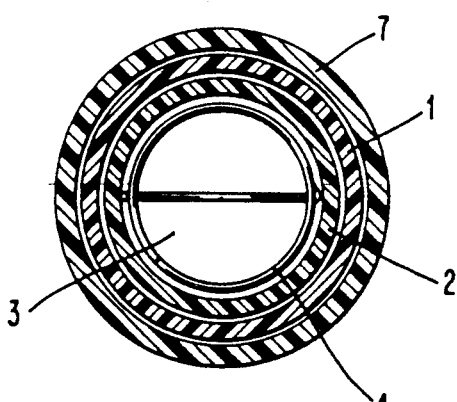
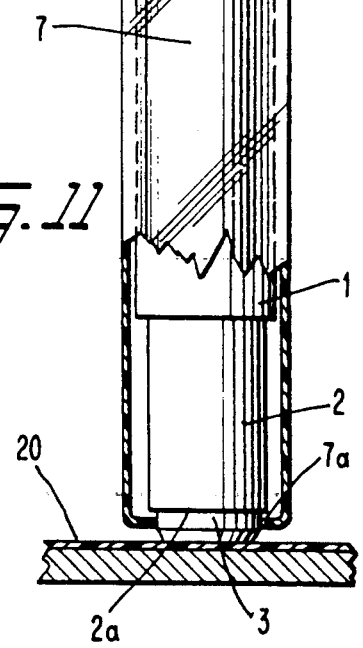

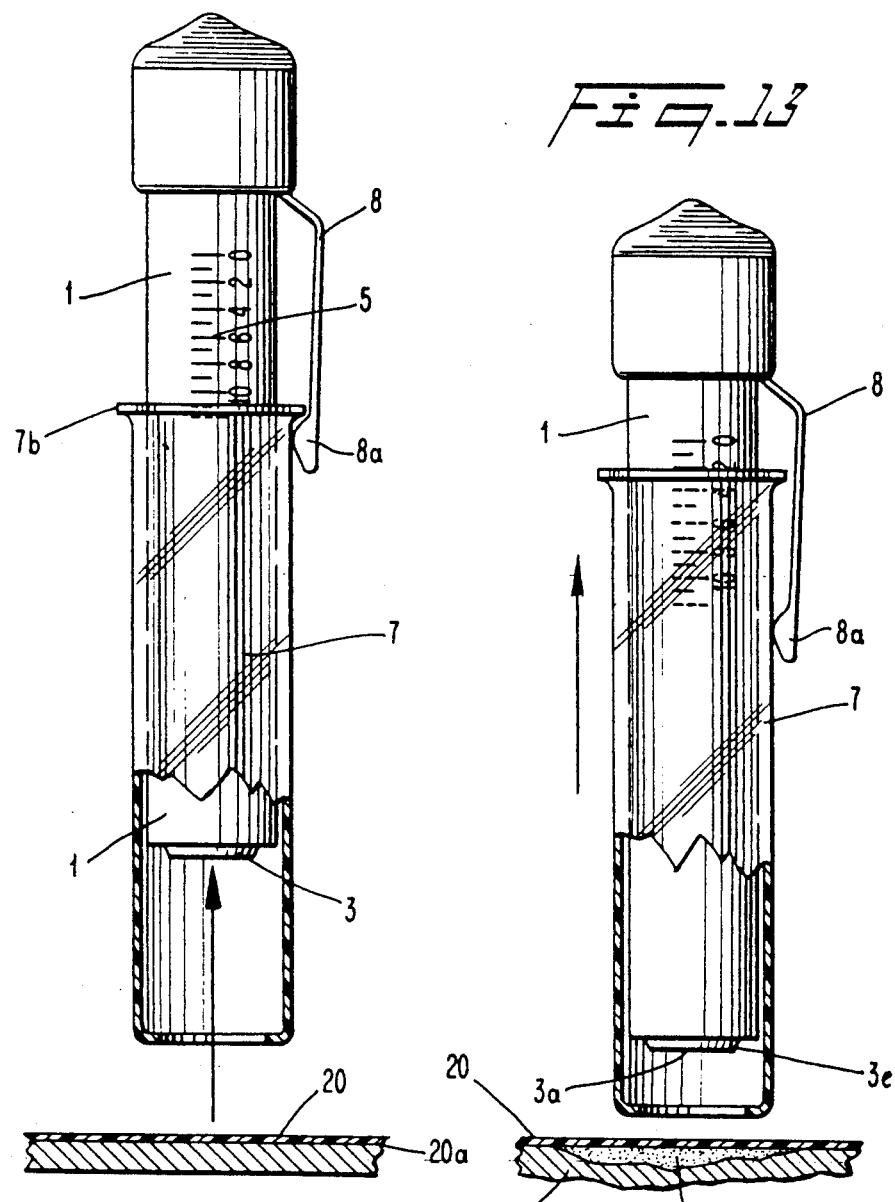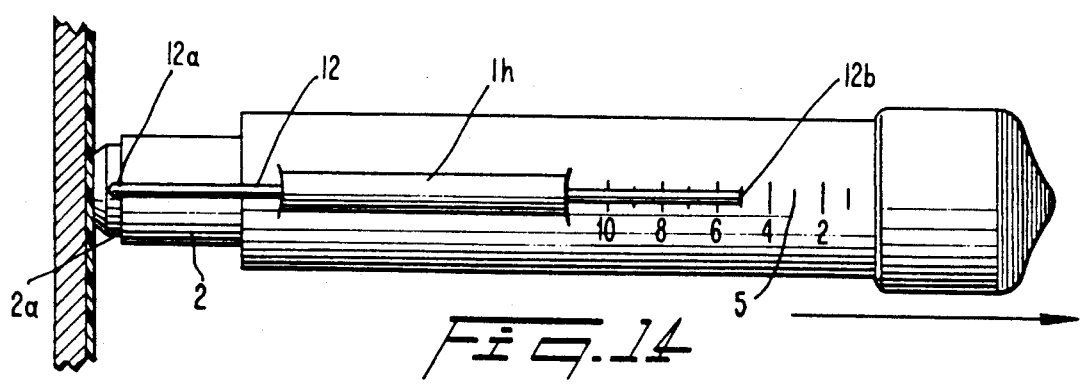

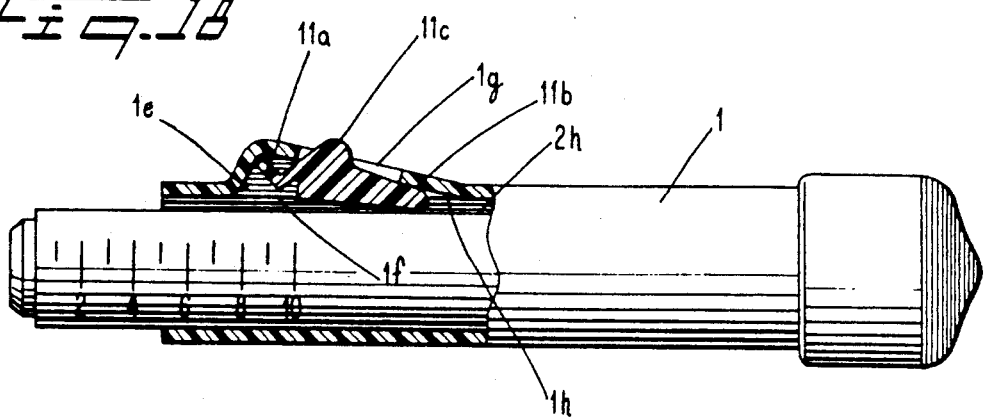
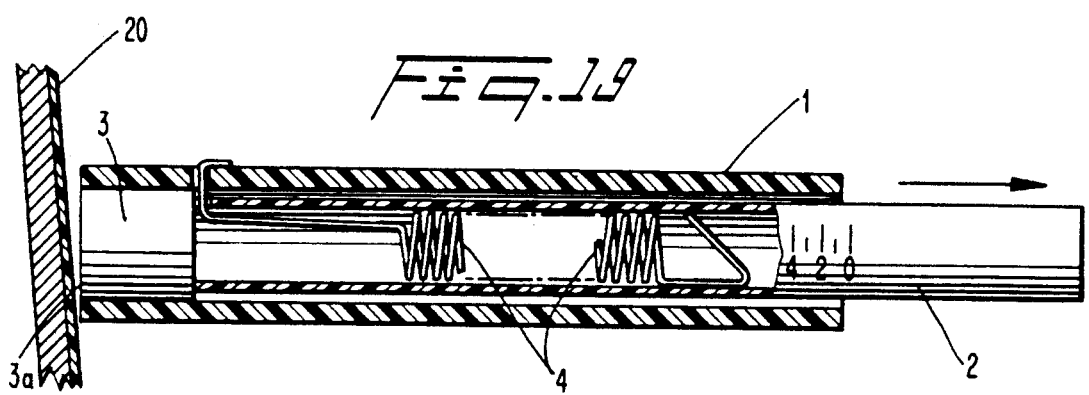
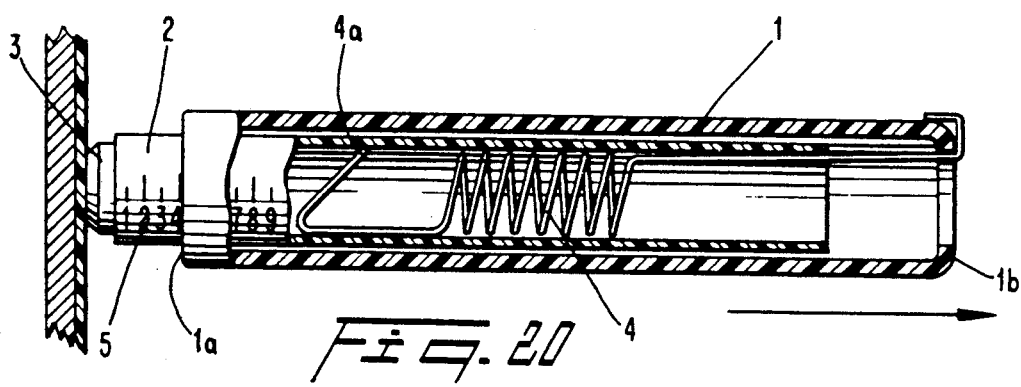

LOW COST MAGNETIC COATING THICKNESS GAUGE WITH HOLDING MAGNET, BIAS SPRING AND HOLDING FORCE INDICATOR

TECHNICAL FIELD

This invention relates to magnetic instruments that measure the thickness of nonferrous coatings on ferrous materials and specifically to an improved construction that enables a substantial decrease in manufacturing cost.

BACKGROUND ART

Conventional magnetic coating thickness gauges employ constructions that make them complicated and therefore expensive to manufacture. Their design makes cost so prohibitively high that it is very rare to find an auto body shop, painter, or small manufacturing firm that owns one. Presently, the two lowest cost gauges commonly available are Tinsley at over $150 and Pentest (Reg. U.S. Pat. & TM. Off.) at nearly $200.

The Tinsley gauge is representative of prior art gauges that do not record the reading. Its structure is relatively complicated and expensive to manufacture. Its housing has two nonsymmetrical portions, is made of nonmagnetic metals, and resembles a thin pencil. The leading end of the housing is bored to slidably receive an interior magnetic member which is about the diameter of a pencil lead. This portion of the housing also has material removed from two opposite sides to form flat surfaces upon which the lines and numbers of the indicia are located. Longitudinally extending slots are formed in the center of both flat surfaces to expose the interior member to view. The trailing end portion of the housing has a bore of larger diameter to receive a spring.

The present invention, by comparison, has a single piece of thin-walled tubing as its housing. The housing is symmetrical with no slots, drilling, or machining required, and can be manufactured if desired with inexpensive materials such as extruded plastic.

In addition to substantial savings in manufacture, the present invention also has significant advantages in ease of reading. The Tinsley indicator must be viewed through a slot of less than 0.035 inch width, while this invention has an indicator typically more than ten times larger at 0.410 inch. Furthermore, the present invention permits larger numbers, numbers adjacent to the markings as opposed to being separated by a slot, and room for two or more additional adjacent sets of indicia plus additional room for add-on indicia tailored to the end user's needs. The present invention also uncovers the numerical readings on the indicia as the housing is being withdrawn from the surface being tested. When using a gauge that doesn't record readings, this is a significant aid to remembering the maximum reading.

The Pentest gauge, disclosed in U.S. Pat. No. 4,392,305, is representative of the least expensive gauges which record readings. Its construction is also relatively complicated and expensive to manufacture. It has over twelve components compared to the present invention's recording ratchet embodiment which has five.

Gauges which record readings by using a micrometer screw feed system of increasing tension on the spring, such as disclosed in U.K. Pat. No. 799,768, U.S. Pat. No. 2,625,585, Austria Pat. No. 215169, Soviet Pat. No. 590591, and U.K. Pat. No. 907721 are still more complicated and expensive to manufacture.

Devices such as the SNITCH Body Filler Detector and the device disclosed in U.S. Pat. No. 4,634,974 are not gauges, possessing no scales and unable to produce accurate comparative readings. Both devices are designed to detect whether or not the nonferrous coating is greater than a predetermined value. If the plunger of either device can be held at a maximum point of travel inside the housing, then the coating thickness is less than the predetermined one value. Even though these devices are not sophisticated enough to produce gauge readings, their housings are of irregular shape and therefore more expensive to manufacture than the tubular housings of the present invention. The magnet members are also more complicated on these devices, employing four components as distinguished from two on the present invention.

FIFI, also called Filler Finder, is another device which only provides a yes or no indication to its predetermined values. The display is accomplished with two lights.

Other devices such as disclosed in U.S. Pat. No. 4,433,290 are considerably different in construction and use. This referenced device is intended to compare surfaces and is constructed with a permanent magnetic rod and a ferromagnetic rod supported and held in parallel alignment by two nonmagnetic sliders.

Other prior art includes components of magnetic thickness gauges such as the pole piece described in U.S. Pat. No. 3,761,804 which relates specifically to magnetic micrometers. Calibration methods such as disclosed in U.S. Pat. No. 4,160,208 are of general interest but have no direct bearing on the present invention.

DISCLOSURE OF INVENTION

An object of the present invention is to provide a coating thickness gauge that is inexpensive to manufacture and therefore affordable to auto body repairers, inspectors, and consumers. To this end, the present invention utilizes a minimum number of components; these components are of configurations that require the least expensive machining processes, and their structures permit use of inexpensive materials.

A further object of the present invention is to provide a coating thickness gauge whose structure permits large numerals and indexing marks on its scale and further provides a large structure to indicate the reading on the scale, both the large scale and the large indicator improving the ease of reading the gauge. Such an improvement becomes even more valuable when gauges are used in awkward positions and outdoors in either dim lighting or glaring sunlight.

In combination with the above two objects, the present invention also provides a gauge that is relatively fast to use. This is of personal and economic importance in many situations. For example, a painter may wish to measure the thickness of paint in over 10 locations on an auto's body before estimating the cost of refinishing. The non-recording embodiment of the present invention can accomplish this in less than 2 minutes. When a consumer is at a car lot inspecting vehicles for repainted areas and areas previously repaired with body fillers, it is desirable to spot check one hundred or more locations per car. The frictional recording embodiment of the present invention is even faster to use and read than the non-recording embodiment, permitting as many as fifty measurements per minute.

The speed is attained because the structure of the several embodiments of the present invention provide ease of reading, even at arm's length so that the gauge and eye do not have to brought into close proximity. Additionally, in the case of the frictional recording embodiment, fast one-handed operation and reset is provided. The gauge is simply pulled off the surface being tested, the reading is observed, the gauge is pressed back into contact with the next surface to be tested, pushing the indicator back to its resting point, and the cycle is repeated.

The invention accordingly comprises the features of construction, arrangement of parts, and construction of elements that will be exemplified in the construction set forth hereafter, and the scope of the invention will be indicated in the claims.

BRIEF DESCRIPTION OF DRAWINGS

For a fuller understanding of the nature and objects of the present invention, reference should be made to the following detailed description, taken in connection with the accompanying drawings, in which:

FIG. 1 is a side view of the non-recording embodiment of the present invention as it is placed on a surface being tested.

FIG. 2 is a top view of the non-recording embodiment of the present invention.

FIG. 3 is an enlarged cross section along lines 3—3 of FIG. 1 of the non-recording embodiment of the present invention.

FIG. 4 is a side view in cross section along long lines 4—4 of FIG. 2 the non-recording embodiment of the present invention.

FIG. 5 is a side view of the non-recording embodiment of the present invention as it is being pulled off a surface being tested.

FIG. 6 is an enlarged side view of the leading end of the present invention with the slider exposed to show the additional gravity-compensating scale.

FIG. 7 is a side view in cross section along lines 4—4 of FIG. 2 of the non-recording embodiment of the present invention as it is being pulled off a surface being tested.

FIG. 8 is a side view of a frictional recording embodiment of the present invention as it is placed on a surface being tested.

FIG. 9 is an enlarged top view in cross section along lines 9—9 of FIG. 8 of the frictional recording embodiment of the present invention.

FIG. 10 is a side view in cross section of a frictional recording embodiment of the present invention as it is placed on a surface being tested.

FIG. 11 is a side view with a partial cross section of the leading portion of the indicator tube of a frictional recording embodiment of the present invention as it is being pulled off a surface being tested.

FIG. 12 is a side view with a partial cross section of the leading portion of the indicator tube of a frictional recording embodiment of the present invention after it is pulled off a surface being tested.

FIG. 13 is a side view with a partial cross section of the leading portion of the indicator tube of a frictional recording embodiment of the present invention after it is pulled off a surface being tested which has an additional non-ferrous coating.

FIG. 14 is a side view of a second frictional recording embodiment which uses a rod member to indicate the reading as the invention is being pulled off a surface being tested.

FIG. 18 is a side view of a recording embodiment with a partial cross section of the housing and wedge with the invention recording a reading of "5".

FIG. 19 is a side view in partial cross section of a non-recording embodiment with magnet secured in the outer tubular member.

FIG. 20 is a side view in partial cross section of a non-recording embodiment with the magnet secured in the inner tubular member.

Similar reference numerals refer to similar parts throughout the several views of the drawings.

BEST MODES FOR CARRYING OUT THE INVENTION

Figure 15:
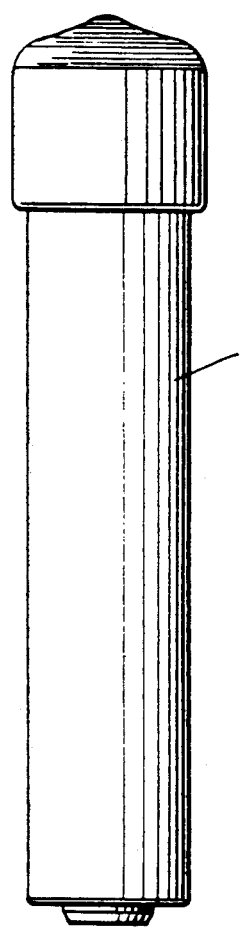
FIG. 15 is a side view of a recording embodiment of the present invention which uses an internal ratchet.

The basic elements of the present invention are shown in FIGS. 20 and 19. A non-recording embodiment is shown in FIGS. 1 through 7. A preferred frictional recording embodiment is shown in FIGS. 8 through 13. Other recording embodiments are shown in FIGS. 14 through 17.

The present invention as shown in FIG. 20 consists of four components all of which are inexpensive to manufacture. The four components are housing 1, slider 2, magnet 3, and spring 4. Scale 5 is imprinted or embossed on the slider. Calibration is possible because leading end 4a of the spring can be moved to increase or decrease spring tension.

Housing 1 is of thin-walled tubular design. For minimal cost it can be made of extruded plastic sheared off at the chosen length. Plastic has the advantages of corrosion and dent resistance. The housing protects and encases the internal parts of the gauge and its leading edge 1a is used to indicate the reading on scale 5. The trailing edge 1b can be inexpensively formed radially inwardly to stop travel of slider 2.

Slider 2 is of thin walled tubular design. For minimal cost, it can be made of extruded or drawn materials and sheared off at the desired length. Magnet 3 is slidably received within the leading end of the slider and secured there by press fit, or other suitable means to form a slider assembly. The slider holds the magnet in alignment with the housing to provide minimal frictional engagement therebetween and to prevent tilting and binding of the magnet as it moves relative to the interior walls of the housing. Moreover, the slider secures the position of the magnet at the leading end of the housing and thereby prevents the magnet from entering too far inside the housing.

Securing the magnet inside such a tubular member can also prevent the sharp outer edge of the magnet 3a FIG. 19 from contacting the surface being tested 20. This in turn lessens the likelihood of chipping or scratching of the surface because the softer material of the tubular member contacts the surface when the tool is disposed at an angle other than a 90 degree angle relative to the surface as shown in FIG. 19.

Slider 2 also provides a large surface area enabling large indicia numbers and markings 5, FIG. 20, multiple scales 5b, FIG. 6, and room for specialized scales to be added on later by the end user.

The slider also provides an inexpensive means of attaching spring 4 to the magnet. High energy magnets are typically very hard, brittle, and difficult to machine. The slider decreases manufacturing costs by eliminating the need for machining holes, channels or other attachment means which are relatively expensive.

Sizable cost reductions are also accomplished by using such modern inexpensive high energy magnets as ceramic 5, as distinguished from the expensive alnico magnets used in previous gauges.

The structure of the present invention further allows use of commonly available shapes and sizes of ceramic magnets, eliminating the need for specialized ceramic 5 molds which are very costly. Ceramic 1 and rubber magnets have considerably less holding force than ceramic 5 magnets but they cost less and can be utilized in all the embodiments.

The spring has a hook-shaped leading end 4a FIG. 20 whose radial extent before installation is greater than the inner diameter of the slider. This permits it to be easily slid into the housing. Furthermore it prevents the spring from being withdrawn and therefore eliminates the need for any other attachment means. Still further, it provides means for setting the attachment point at any distance along the slider and thereby provides a means for adjusting the spring tension and calibration of the gauge.

The spring can be manufactured with a preload in its resting state. By manually stretching the spring beyond its elastic limit, the preload can be decreased, providing an additional means of calibration adjustment.

FIG. 19 shows an embodiment of the present invention in which the magnet 3 is secured within the housing 1. In this embodiment slider 2 is pulled away from the surface being tested. In both embodiments shown in FIG. 20 and FIG. 19, the spring 4 attaches to housing 1 and slider 2, and the scale 5 is located on the slider and is uncovered as the slider comes out from within the housing. When the embodiment shown in FIG. 20 is not in use, the slider is not visible and therefore is more aesthetically pleasing. Also, the magnetic dirt and debris which can accumulate near the magnet during use can be more effectively cleaned from between the slider and housing in the embodiment shown in FIG. 20. The spring is secured to the housing of the embodiment shown in FIG. 19 through a hole in the housing, and is secured the housing in the embodiment shown in FIG. 20 by being hooked around trailing end 1b.

In one major commercial application of magnetic coating thickness gauges, manufacturers measure the thickness of paint on steel products and refinishers measure the thickness of paint on vehicle bodies. The thickness typically needed to be measured in this application ranges from about one thousandth to fifteen thousandths of an inch and requires an accuracy within one thousandth of an inch. FIGS. 1 through 7 show an embodiment of the present invention particularly suited for this application. Non-recording embodiments of this invention are better suited for the high degree of accuracy required in this application because they are not subjected to the variable friction or jarring associated with the additional mechanical means necessary to hold or record the travel of the slider.

FIG. 1 shows a non-recording embodiment of the present invention with its magnet 3 placed on a surface to be tested 20. Also visible is cap 6, which is also shown in the top view, FIG. 2. Measurement of a narrow range such as one to fifteen thousandths of an inch paint thickness requires that a spring of low spring rate be used. The height of the gauge enables low spring rate springs to be stretched sufficiently.

The essential components of the invention are shown in cross section FIG. 3: housing 1, slider 2, magnet 3, and spring 4.

The trailing end of the spring is hooked through a hole in adjusting screw 10 FIG. 4. The adjusting screw provides an additional means of calibration which is sensitive and permits easy movement in either direction.

Plug 9 FIG. 4 is center bored and threaded to hold the adjusting screw. The plug is affixed inside the trailing end of housing 1 thereby providing a stop for the slider 2. This eliminates the need for other stop means such as the internal flare 1b FIG. 20 of the housing for about the same cost. The plug can be made out of materials such as soft plastic or natural or synthetic rubber to economically give the additional advantage of a shock absorber for attenuating the impact of the slider.

Cap 6 is installed primarily for the cosmetic purpose in the non-recording embodiment of covering the adjusting screw. The cap also discourages unwarranted tampering with the adjusting screw. When the cap is made of materials such as flexible vinyl and is glued onto the housing, recalibration can be accomplished by cutting a small slit at top 6b FIG. 7 of cap to allow entry of a small tool to turn the adjusting screw. The cutting of a slit in the cap also then provides notice to the manufacturer or gauge user that readjustment of the calibration has occurred.

FIG. 5 shows a non-recording embodiment of present invention in use. FIG. 1 shows the first step: placing the magnet 3 on a surface being tested 20. FIG. 5 shows the housing 1 being pulled away from the surface being tested 20. Scale 5 on slider 2 is increasingly exposed until the force of the spring attached to the slider and magnet assembly is greater than the holding force of the magnet on the surface being tested. At that point the magnet pulls off the surface being tested and the slider and magnet are pulled by the spring back into the housing.

The use of non-recording gauges is made difficult by the fact that the reading disappears the instant the magnet separates from the surface being tested. Ease of reading is enhanced in the non-recording embodiment of the present invention by locating the indicia numbers on the slider. The user simply counts off the numbers as they are exposed as the housing is pulled off the slider.

To further facilitate memorization or recordation of the last position reached at the moment the reading disappears, the non-recording embodiment of the present invention uses sets of distinctly shaped markings to refer to alternating sets of numerical readings that appear sequentially on the scale. One example of this is using dots for odd-numbered readings such as 0.001, 0.003, 0.005 and using dashes for even numbered readings such as 0.002, 0.004, and 0.006.

A further improvement in ease of reading is accomplished by consistently using the same marking for the same incremental difference in the reading. For example, in the Tinsley gauge scale the first line above the 0.005 mark apparently indicates 0.006, although it is not so labeled. However, the first line below the 0.005 mark apparently indicates 0.0045, although it is not labeled either. The reading increments which identical lines refer to change again below 0.001, and change still again above 0.010.

The structure of the present invention provides the advantage of sufficient room for additional scales to be supplied later alongside the original scales. For example, if a paint manufacturer found that its new composition of paint held up well when it was applied over a base of previously-applied paint having a thickness less than 0.005 inch, held up marginally over bases of 0.005 to 0.010, and was not recommended for application over bases thicker than 0.010 inch, a self-adhesive scale that simply noted "good," "marginal," and "bad" could be easily affixed on the slider adjacent to the existing indicia to facilitate use of the gauge.

A second scale 5b FIG. 6 printed alongside the first, corrects for the effect that gravity has on the readings. When gauges are held vertically and placed down on a coated surface, the spring must overcome both the weight of the magnet and the magnetic holding force. If the same test piece is turned over and the gauge held vertically up on the same coated surface, the spring only needs to overcome the magnetic holding force minus the weight of the magnet assembly. If the same test piece is turned on its side and the gauge is held horizontally on the same coated surface, the weight of the magnet assembly has negligible effect and the gauge reading is in between the above two readings.

The effect of gravity on the accuracy of measurements of magnetic coating thickness gauges can be considerable. For example, a gauge measuring a perfectly uniform coating on a square box could produce readings of as little as 0.008 inch on some panels, while reading as much as 0.012 inch on other panels.

The present invention is shown in FIG. 6 with two separate scales. The scale labelled "TOP" is used for measuring coatings on the top of horizontal surfaces such as hoods and roofs of automobiles. The scale labelled "SIDE" is used for measuring the thickness of coatings on horizontal surfaces such as doors and sides of fenders on automobiles.

To further clarify to the user which scale should be used on a surface being tested, labels "TOP" and "SIDE" and the numerals on their respective scales are oriented differently. The scale used for measuring top surfaces has the numerals and label "TOP" oriented with their bottom end toward the magnet as shown in FIG. 5 which makes this scale easy to read when the gauge is held vertically over a surface. With the gauge held vertically over a surface, the scale labelled "SIDE" and its numerals are up-side-down and therefore more difficult to read. However when the gauge is placed on a vertical surface such as the side of a door, the user is forced to stand at the side or cap end of the gauge. Orienting the scale label "SIDE" 5b FIG. 6 and its numerals with their bottom end toward the cap makes this scale the easier of the two scales to read when the gauge is held upon a vertical surface.

The multiple scales are typically used on the non-recording embodiments of the present invention because the non-recording embodiments are more suitable for applications where very accurate measurements are required.

Accuracy and consistency of readings is increased by making the leading end surface of the magnet into a shallow cone shaped configuration, 3c FIG. 6. This configuration results in a small point of contact of the magnet with the surface being tested and therefore the area of contact is little changed if the housing is pulled away from the surface being tested at other than a perfect right angle. The cone shape has only one angle and therefore is less expensive to machine or manufacture than the spherical shapes shown in prior art.

FIG. 7 shows a non-recording embodiment as the housing is being pulled away from a surface being tested. The trailing end of the spring has a straight longitudinal portion 4c of greater length than the maximum length of travel of the slider in normal use. The straight portion of the spring prevents the trailing edge 2b of the slider assembly from contacting the coils of the spring during use, which could cause chatter and variable friction and would interfere with the accuracy of the readings. The straight longitudinal portion on the trailing end of the spring also can be used in the recording embodiments of this invention.

Of the various recording embodiments of the present invention, the frictional recording embodiments have neither the limitation of a finite number of indicator positions nor the need for the recording mechanism to be released with a separate manipulation. A preferred frictional recording embodiment of this invention is shown in FIGS. 8 through 13.

The frictional recording embodiment differs from the non-recording embodiments shown in the previous figures by having the addition of memory member 7 FIG. 8 and clip 8, but does not require plug 9 FIG. 7 or screw 10. The preferred frictional recording embodiment is shown in FIG. 8 placed upon a surface to be tested 20. The memory member 7 is shown as a transparent tube and is further illustrated in cross-section in FIG. 9 and FIG. 10.

The manner in which the memory member records the reading is illustrated in FIGS. 11 through 13. Leading end 7a FIG. 11 of memory member 7 extends radially inwardly where it abuts the leading edge 2a of the slider. The clip and cap are securely attached to the housing by interference fit which can be augmented with glue. The clip, cap, and housing 1 form a housing assembly which is pulled away from the material being tested 20 in the direction shown by the arrow in FIG. 11. Memory member 7 is held to slider 2 and thereby moves longitudinally with respect to housing 1.

FIG. 12 illustrates the present invention after the magnet pulls off the surface being tested. The spring pulls the magnet and slider back into the housing as shown by the direction of the arrow. The memory member, however, stays extended on the housing due to a slight frictional load. i.e., the memory member does not retract or otherwise move when the magnet and slider are retracted by the spring. Thus, the memory member records or remembers the instantaneous position of the slider at the moment the magnet lost its magnetic engagement with the material being tested. The trailing edge 7b of the extended memory member indicates the reading on scale 5 which is located on housing 1. In FIG. 12 the memory member indicates a reading of greater than "10". The surface being tested has a nonferrous coating 20a equal in thickness to one factory paint job. In FIG. 13 the memory member indicates a reading of "2". The surface being tested has additional nonferrous materials 20c between the painted surface and the ferrous substrate 20b. Such additional nonferrous materials increase the distance between the magnet and the ferrous substrate when the magnet is placed against the surface to be tested. The increased distance results in a decreased magnetic holding force and therefore decreased travel of the slider and memory member as evident by the lower reading.

The scale on the embodiments shown in FIGS. 8 through 18 has numerals inversely proportional to the thickness of nonferrous material being measured. To be meaningful to consumers using the invention to inspect the condition of automobile bodies, lower numerical readings indicate a lower desirability of the condition of the body being inspected. In manufacture, the holding force of the magnet, the spring rate, and the calibration are chosen so that the typical thickness of a coat of factory applied paint results in full travel of the slider and memory member and indicates a reading of "10". The "10" is an arbitrary value chosen to signify a perfect score such as in the common idiom and performance ratings in Olympic games. The increased coating thickness caused by additional paint jobs results in readings typically from "9" to "5". Lower numerical readings signify a greater coating thickness typically caused by body fillers used to cover up hidden collision or rust damage.

Constructing memory member 7 out of thin-walled tubing which then slidably receives housing 1 produces the advantage of requiring no attachment means such as channels or guides. Constructing the memory member out of clear plastic tubing enables the product name to be visible when the name is located on the housing. This simplifies manufacture by requiring only one printing on one component. The printing consists of the product name, scale 5, and any other needed information. Although the aforementioned structure is preferred, it should be noted that clear tubing also enables other options of location of scale and indicator markings such as scale on the memory member with the leading edge of the housing being the indicator.

The frictional load is accomplished by clip 8 FIG. 13 which is attached to the trailing end of the housing and which contacts memory member 7 at the rounded leading end 8a of the clip and thereby holds the memory member against the housing. Clips made of spring steel can be bent to adjust the force and thereby adjust the frictional load, giving the advantage of another means of calibration that is useful during assembly. The frictional load must be sufficient to prevent the memory member from either falling under its own weight due to gravity or and prevent the memory member from moving due to the sudden movement caused by the impact of the slider as it comes to a stop inside the housing. However, the frictional load must not be so high as to substantially interfere with measurement of the magnetic holding force.

An outwardly extending radial flange 7b FIG. 12 on the trailing edge of the memory member provides a stop means for the travel of the memory member, and thereby the slider assembly, when the flange engages the rounded leading end 8a of the clip as shown in FIG. 12. An additional advantage of the stop means is to help prevent the memory member from inadvertently falling off the gauge.

This stop means also provides a means of releasable attachment for the memory member. Releasable attachment aids in assembly and calibration procedures, and permits the user to remove the memory member to clean debris off the magnet and slider and to clean between the housing and memory member. This is useful because it is not uncommon for magnetic particles to collect in these locations during use, and such particles significantly interfere with both the maximum holding force of the magnet and the sliding friction at points of engagement between the components. Both of these conditions affect readings.

In this frictional embodiment of the present invention, the leading end 7a FIG. 11 of the memory member protrudes inward to contact the end 2a of the slider. The magnet 3 must protrude beyond the end of the slider by an amount greater than the length of the memory member protrusion so that the memory member does not interfere with the magnet's contact on the surface being tested 20.

The leading edge 3e FIG. 13 of the magnet is chamfered to help guide the magnet through the memory member without snagging. The chamfer has the additional advantage of eliminating the sharp edge which could easily chip or scratch the surface coating being tested. It is preferred to polish the leading surface 3a of the magnet for this same purpose.

The leading surface of the magnet is flat, not hemispherical as in many prior art devices. The advantage in machining and production costs is considerable and the flat surface does not significantly affect the readings in the applications intended for this recording embodiment of the present invention.

The cap 6 FIG. 10 provides a stop means for the trailing end of the slider eliminating the need for other stop means such as the inwardly directed flange 1b FIG. 20. A cap composed of materials such as flexible vinyl is equally as inexpensive as the forming operation it replaces, and is self-adhering. Furthermore, the cap seals the trailing end from dirt, absorbs the shock of impact resulting from stopping the motion of the slider, and covers the trailing end of the spring as well. The cap also provides a convenient handle for grasping the housing assembly and pulling it away from surfaces during tests.

Trailing end 4b FIG. 10 of the spring is directed radially outwardly and locks over the housing assembly for simplicity in installation and attachment.

Frictional recording embodiments of the present invention can use a memory means of construction other than a tube. FIG. 14 shows a frictional recording embodiment of this invention which uses a rod member 12 to record the reading. Like the tubular memory member in previous figures, the rod member has an inwardly directed leading end 12a that is abutted by the leading end 2a of the slider. The slider 2 holds the rod member as the housing 1 is withdrawn from a surface being tested. The trailing end 12b of the rod member indicates the maximum travel of the slider relative to the housing by indicating the reading on scale 5. Housing boss 1h locates the rod member and provides the slight frictional engagement necessary to hold the rod member at its point of farthest travel. A rod member has the advantage of less weight than a tubular recording member, which permits a lesser frictional engagement.

Figure 16:
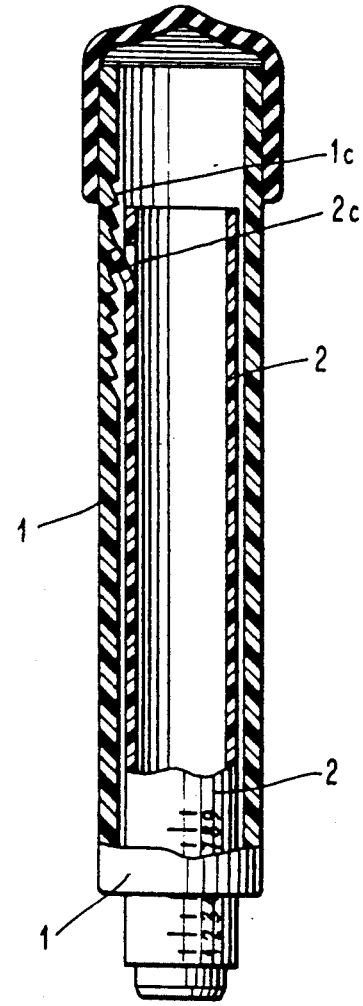
FIG. 16 is a side view of a recording embodiment of the present invention in partial cross section of the internal ratchet mechanism. The spring is omitted for clarity and the invention is recording a reading of "4".

The embodiment of the present invention shown in FIG. 15 and FIG. 16 has an internal ratchet that locks the slider in its farthest extended position to facilitate reading. FIG. 15 shows the invention before recording a reading. FIG. 16 shows the invention recording a reading of "4". The inside surface of the housing has one or more longitudinally extending rows of teeth 1c slanted to allow movement toward the leading end but to block travel toward the trailing end. The slider has a portion of its trailing edge 2c which protrudes radially outwardly. This protrusion presses lightly against the teeth, so that it slides along the teeth in one direction while locking in place in the other direction. To release the ratchet, the slider is rotated with respect to the housing until the slider protrusion is moved out of the housing's row of teeth. Both the internal teeth and protrusion can be inexpensively hot-formed or stamped with dies.

Figure 17:
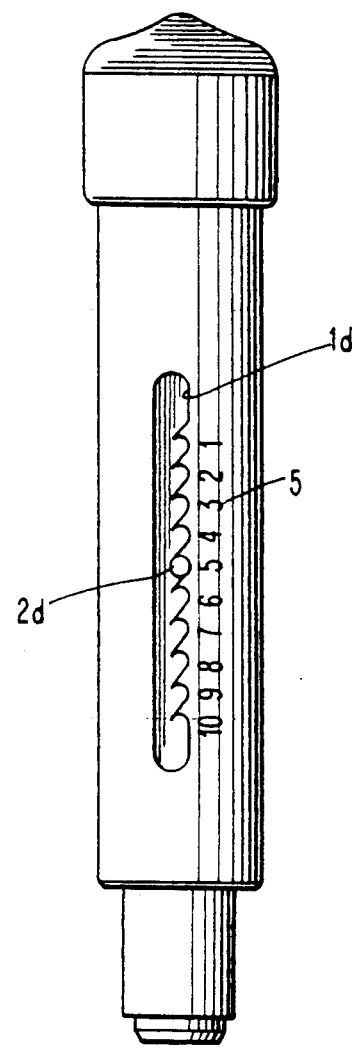
FIG. 17 is a side view of a recording embodiment using a pawl and slot ratchet with the invention recording a reading of "5".

FIG. 17 shows another inexpensively manufactured embodiment of this invention consisting of a slot 1d with teeth die-cut in the housing. A pawl 2d is formed or embedded in the slider and has a slight torsional loading against the teeth provided by the spring. In this embodiment, the scale 5 could be located either on the slider with the leading edge of the housing indicating the reading, or it could be located, as shown on the housing with the pawl or other marking means on the slider indicating the reading.

FIG. 18 shows a recording embodiment using wedge member 11 located in recess 1f formed in the outer housing. Protruding portion 11a of the wedge is compressed and pushes against internal wall 1e of the recess to keep the wedge in constant contact with both the outer housing and the slider. The wedge permits the slider to move out of the housing but bars re-entry because protruding end 11b of the wedge jams between the inner surface 1h of the housing and outer surface 2h of the slider. The slider is released by pushing the wedge toward the magnet end of the slider housing by means of knob 11c that extends through slot 1g in housing 1.

While the above description contains many specifications, these should not be construed as limitations of the scope of the invention, but rather as exemplifications of preferred embodiments thereof. Many other variations are possible. Accordingly, the scope of the invention should be determined not by the embodiments illustrated, but by the appended claims and their legal equivalent.

This invention pioneers the art of low cost thickness gauges and the art of thickness gauges having recording or memory means. As such, the claims that follow are to be interpreted broadly, as a matter of law, in order to protect the heart of the invention.

Now that the invention has been described, what is claimed is:

1. A device that measures the magnetic holding force of a material being tested, comprising:
   a first elongate housing member;
   a second elongate housing member slidably received within said first housing member;
   said first housing member and said second housing member being manually held in use with their respective longitudinal axes positioned in a substantially orthogonal relationship to said material being tested with one of said housing members remaining in position with the material being tested while the other said housing member is telescopically pulled away from said material being tested;
   a permanent magnet;
   said magnet carried by one of one of said housing members with a portion of said magnet protruding beyond said end of said housing member;
   whereby said magnet is placed in contact with said material being tested; said magnet holding said one of said housing members to said material with said magnetic holding force which is inversely proportional to the thickness of the nonmagnetic surface coating which covers the ferrous substrate of said material being tested while the other said housing member is pulled away from said material being tested;
   a biasing means comprised of a coiled spring having a leading end and a trailing end;
   said ends disposed in interconnecting relation to said first housing member and said second housing member;
   said trailing end of said biasing means fixedly secured to said first housing member and said leading end of said biasing means fixedly secured to said second housing member to provide a bias which increases in linear fashion with the distance said first housing member is pulled telescopically out from said second housing member until the bias equals said magnetic force holding said magnet in contact with said surface being tested;
   a first indicia means in the form of a graduated scale, being provided on said second housing member;
   whereby said scale moves relative to said first housing member as one of said housing members is pulled away from said material being tested and whereby the magnetic holding force of said material is indicated by registration of said indicia means and said first housing member when said holding force is equal to the bias provided by said biasing means.

2. The device of claim 1, wherein said first and second housing members are non-magnetic tubular members of thin-walled construction.

3. The device of claim 2, further comprising a calibration means;
   said calibration means connecting one of said housing members and one end of said spring whereby said spring end can be fixedly secured to said housing member at different positions along the longitudinal axis of said housing member for the purpose of changing the amount of bias of said spring to provide fine adjustments in readings.

4. The device of claim 3, further comprising a cap member secured to a trailing edge of said first housing member to limit relative travel of said housing members and to provide a barrier to dirt.

5. The device of claim 3, further comprising a second indicia means in the form of a graduated scale located adjacent to said first indicia means, whereby compensation is made for the weight of the housing carrying said magnet under varying angles of use of said device.

6. The device of claim 3, wherein said permanent magnet is ceramic.

7. The device of claim 3, wherein said second housing member carries said magnet, wherein said leading end of said spring is bent to form a "V" shape that is slidably received within said second housing member, said leading end being flexible and having a breadth greater than an inside diameter of said second housing member so that said leading end is under compression when slidably inserted into said second housing member, said leading end terminating in an angular surface that engages interior side walls of said second housing member to substantially prevent facile retraction of said spring from said second housing member, whereby said leading end is inserted at any preselected depth into said second housing member and whereby engagement of said leading end with said interior walls serves to lock said spring into position, whereby the amount of tension supplied by said spring is adjustable, dependent on the depth of said insertion.

8. The device of claim 3, wherein said first housing member and said second housing member are of cylindrical configuration.

9. The device of claim 3, wherein said indicia means has sets of markings which are of distinct shapes and which consistently reference the same incremental differences in numerical readings, whereby the user can easily note which markings are indicated just prior to the moment said second housing member is pulled into said first housing member by said spring.

10. The device of claim 3, further comprising a dampening means disposed at trailing end of said first housing member against which said second housing member impacts to attenuate the force of impact of said second housing member when it is pulled into said first housing member by said spring after said magnet has released from the material being tested.

11. The device of claim 3, wherein said spring has a predetermined preload in its resting state whereby stretching of the spring beyond its elastic limit reduces the preload and thereby provides additional means for adjustment of spring tension for calibration.

12. The device of claim 5, wherein said first indicia means has letters or numerals oriented with their bottom side toward said magnet and said second indicia means has letters or numerals orientated with their top side toward said magnet.

13. The device of claim 3, wherein said magnet has an end surface of conical configuration.

14. A device that measures the magnetic holding force or a material being tested and which records the measurement, comprising:

a first elongate housing member;

a permanent magnet;

a second elongate housing member to a leading end of which is secured said magnet to comprise a slider assembly, said slider assembly being received within said first housing member;

whereby in use said magnet is placed in contact with said material being tested and both said housing members are positioned at a ninety degree angle to the surface of the material being tested, said first housing member being held by hand and pulled slowly away from the surface being tested until said magnet is pulled off the surface being tested;

a coiled spring connecting said first housing member and said slider assembly;

said spring having a leading end and a trailing end;

said ends disposed in interconnecting relation to said first housing member and said second housing member;

said trailing end of said spring fixedly secured to said first housing member and said leading end of said spring fixedly secured to said second housing member to provide a bias which increases in linear fashion with the distance said first housing member is pulled telescopically out from said second housing member until the bias equals said magnetic force holding said magnet in contact with said surface being tested;

an indicia means in the form of a graduated scale, said indicia means being disposed on said slider assembly, whereby said first housing member is relatively moveable with respect to said scale as said first housing member is displaced relative to said slider assembly;

a memory means of solid composition having first and second ends disposed between said slider assembly and said housing member;

one end of said memory means having light frictional contact with one of said housing members;

the other end of said memory means secured to or abutting the other said housing member;

said light frictional contact permiting sliding movement of one of said housing members along said memory means in one longitudinal direction to permit withdrawal of said slider assembly from said first housing member;

said frictional engagement increasing with movement in the opposite longitudinal direction causing said memory means to securely engage said housing member barring re-entry of said slider assembly back into said first housing member until said memory means is released from engagement with one housing member, whereby at the conclusion of the test the measurement is recorded for display.

15. The device of claim 14, wherein said memory means is a ratchet;

said ratchet comprised of a pawl fixedly secured and protruding from said slider assembly in light frictional engagement with longitudinally extending rows of teeth cut or formed into said housing assembly;

said ratchet freely permitting extension of said slider assembly from the interior of said first housing member while barring re-entry of said slider assembly into said first housing member until said ratchet means is released.

16. The device of claim 14, wherein said memory means is a wedge member disposed between said slider assembly and said first housing member, said wedge member freely permitting extension of said slider assembly from the interior of said first housing member while barring re-entry of said slider assembly into said first housing member until said wedge means is released.

17. The device of claim 14, wherein said permanent magnet is ceramic.

18. The device of claim 14, wherein said first and second housing members are of cylindrical configuration.

19. The device of claim 14, wherein said first and second housing members are thin-walled, non-magnetic tubing members.

20. The device of claim 14, wherein at least one of said housing members is formed of a polymerizable material.

21. The device of claim 14, further comprising a cap member that securely engages the trailing edge of said first housing member to stop travel of the slider assembly or to provide a barrier to the entry of dirt.

22. The device of claim 14, further comprising a calibration means to enable fine adjustments in readings.

23. The device of claim 14, wherein said leading end bent to form a "V" shape that is slidably received within said slider assembly, said leading end being flexible and having a breadth greater than an inside diameter of said slider assembly so that said leading end is under compression when slidably inserted into said slider assembly, said leading end terminating in an angular surface that engages interior side walls of said slider assembly to substantially prevent facile retraction of said spring from said slider assembly, whereby said leading end is inserted at any preselected depth into said slider assembly and whereby engagement of said leading end with said interior walls serves to lock said spring into position, whereby the amount of tension supplied by said spring is adjustable, dependent on the depth of said insertion.

24. A device that measures the magnetic holding force of a material being tested and records that reading, comprising:
- a first elongate housing member;
- a permanent magnet;
- a second elongate housing member having said magnet secured thereto at a leading end thereof to form a slider assembly, said slider assembly slidably received within said first housing member;
- whereby in use said device is placed with said magnet in contact with said material being tested and said housing members are positioned at a substantially orthogonal relationship to the material being tested and said first housing member is slowly pulled from said material being tested in the direction of the respective longtudinal axes of said housing until said magnet is pulled from contact with said material being tested;
- a coiled spring having a leading end and a trailing end;
- said ends disposed in interconnecting relation to said first housing member and said slider assembly;
- said trailing end of said spring fixedly secured to said first housing member and said leading end of said spring fixedly secured to said slider assembly to provide a bias which increases in linear fashion with the distance said first housing member is pulled telescopically out from said slider assembly until the bias equals said magnetic force holding said magnet in contact with said surface being tested so that the maximum distance said first housing member and said slider assembly move with respect to one another is a measure of said magnetic holding force;
- a memory means comprised of an elongate member whose longitudinal axis is in a substantially parallel relationship with the longitudinal axis of said first housing member;
- said first housing member slidably received within said memory means, in low frictional engagement therewith;
- a radially inwardly directed flange member formed on a leading end of said memory means;
- said flange member being abuttingly engaged by a leading edge of said slider assembly as said slider assembly extends from said first housing member as said first housing member is pulled away from said material being tested, said slider assembly displacing said memory means along the extent of said first housing member, whereby at the end of a holding force test said slider assembly snaps back under the influence of said spring into said first housing member without disturbing the position of said memory means to thereby display the amount of travel of said slider assembly relative to said first housing member;
- and an indicia means in the form of a graduated scale, said indicia means being disposed on either said first housing member or said memory means whereby said memory means or said first housing member moves relative to said scale as said first housing is pulled away from the material being tested.

25. The device of claim 24, wherein said memory means is an elongate tubular housing.

26. The device of claim 25, wherein said memory means is formed of a transparent polymerizable material.

27. The device of claim 24, further comprising a clip member that securely engages said first housing member adjacent a trailing edge thereof to enable said device to be clipped to a support surface such as a shirt pocket.

28. The device of claim 25, wherein said clip member includes a longitudinally extending portion that terminates in a contact member that slidably bears against and frictionally engages said memory means throughout the duration of the test.

29. The device of claim 28, wherein said clip member is semi-rigid and can be bent to increase the frictional resistance between said contact member and said memory means to thereby adjust the calibration of the device.

30. The device of claim 28, wherein said memory means has a stop means in the form of an outwardly directed flange at its trailing edge that limits the amount of relative travel between said memory means and said first housing member when said flange abuttingly engages said contact member, said stop means also limiting the relative travel between said slider assembly and said first housing member and preventing said memory means from being inadvertently separated from the device.

31. The device of claim 24, wherein said permanent magnet is ceramic.

32. The device of claim 24, wherein said first and second housing members are of cylindrical configuration.

33. The device of claim 24, wherein said first and second housing members are thin-walled, non-magnetic tubing members.

34. The device of claim 24, wherein at least one of said housing members is formed of a polymerizable material.

35. The device of claim 24, further comprising a cap member that securely engages the trailing edge of said first housing member to stop travel of the slider assembly or to provide a barrier to the entry of dirt.

36. The device of claim 24, further comprising a calibration means to enable fine adjustments in readings.

37. The device of claim 24, wherein said leading end of said spring is bent to form a "V" shape that is slidably received within said slider assembly, said leading end being flexible and having a breadth greater than an inside diameter of said slider assembly so that said leading end is under compression when slider inserted into said slider assembly, said leading end terminating in an angular surface that engages interior side walls of said slider assembly to substantially prevent facile retraction of said spring from said slider assembly, whereby said leading end is inserted at any preselected depth into said slider assembly and whereby engagement of said leading end with said interior walls serves to lock said spring into position, whereby the amount of tension supplied by said spring is adjustable, dependent on the depth of said insertion.

38. The device of claim 24, wherein said spring has a predetermined preload in its resting state, whereby stretching said spring beyond its elastic limit reduces said preload and thereby provides additional means for adjustment of spring tension for calibration.

* * * * *